May 22, 1962 E. L. PRESSEL ETAL 3,035,444
THERMOSTATIC ELEMENT
Filed May 24, 1955
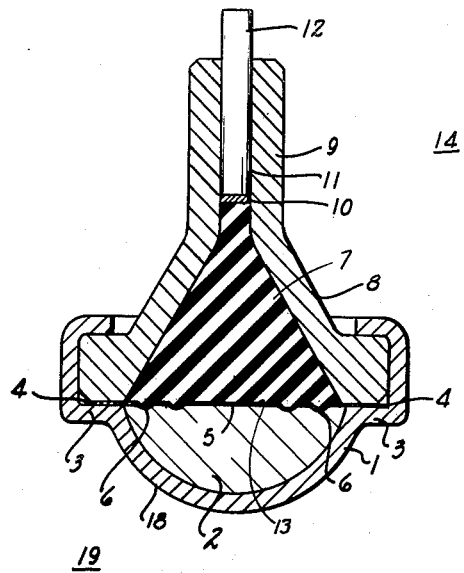
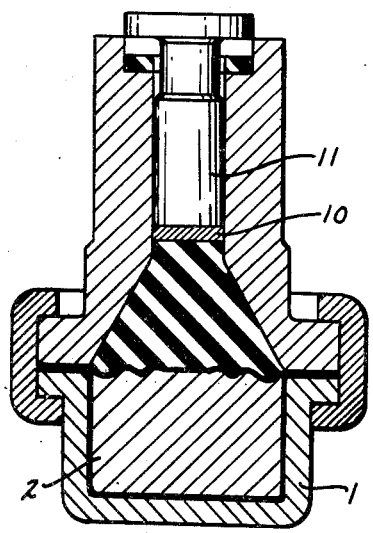
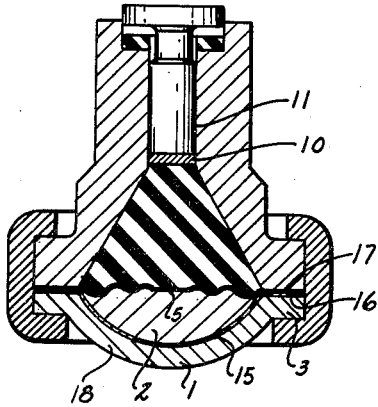
INVENTORS.
EARL L. PRESSEL
BY SERGIUS VERNET
SMITH, OLSEN & KOTTS
ATTORNEYS 3,035,444
THERMOSTATIC ELEMENT
Earl L. Pressel, Detroit, Mich., and Sergius Vernet, Yellow Springs, Ohio, assignors, by direct and mesne assignments, to Antioch College, Yellow Springs, Ohio, a corporation of Ohio
Filed May 24, 1955, Ser. No. 510,708
1 Claim. (Cl. 73—368.3)

This invention relates to thermostatic elements and has particular applicability to those thermostatic elements operating in temperature ranges of the order of 250° F. to 350° F.

Thermostatic elements of the type under consideration generally comprise a vessel of heat conducting material, a body of temperature responsive material within the vessel and sealed therein by a diaphragm, a tapering sleeve overlying the diaphragm, a body of force-transmitting material in said sleeve for translating volumetric changes of the temperature responsive material to a piston which is slidably received within the sleeve, and a spring acting to force the piston into the sleeve against the action of the temperature responsive material.

In operation, the vessel is positioned in a fluid atmosphere of temperature changing characteristics, hereinafter referred to as the ambient atmosphere. As the temperature of the ambient atmosphere is increased, the temperature responsive material undergoes a fusion or polymorphic modification, mesomorphic modification or the like, such as to cause it to expand. Expansion of the temperature responsive material causes the force-transmitting material to be pushed into the interior of the aforementioned sleeve so as to cause the piston to move outwardly relative to the sleeve and against the action of the aforementioned spring. Decrease in temperature of the ambient atmosphere (and hence of the temperature responsive material) causes the temperature responsive material to contract and allows the spring to force the piston against the force-transmitting material so as to move the diaphragm in accordance with the amount of contraction experienced by the temperature responsive material.

There have been developed thermostatic elements operable in temperature ranges of the order of 100° F. to 200° F. Such thermostatic elements have employed rubber diaphragms. These rubber diaphragms are not adapted for use in thermostatic elements operating in temperature ranges of the order of 250° F. to 350° F. because at such elevated temperatures, the rubber material deteriorates so as to cause rupture of the diaphragm after a comparatively few temperature cycle operations. The present invention overcomes the problem of diaphragm deterioration by utilizing as the diaphragm material a metal, preferably one of the stainless steels.

In addition to the problem of diaphragm deterioration experienced with rubber diaphragms, there is the further problem that the rubber diaphragm is overly responsive to pressure changes, whereas a metallic diaphragm can be constructed of sufficiently strong material as to prevent it from responding to these pressure changes. For example, when a rubber diaphragm is employed and the temperature responsive material is undergoing contraction (as on temperature decrease) the ability of the rubber diaphragm to change its contour in response to pressure changes allowed it to closely follow the adjacent surface contour of the temperature responsive material. The contour of the temperature responsive material is continuously changing during this contraction period and there is formed between said surface and the adjacent surface of the diaphragm a partial vacuum. This partial vacuum causes the rubber diaphragm to move with or hug the contour of the adjacent surface of the temperature responsive material, with the result that the vacuum is transferred to the space between the diaphragm and force-transmitting material. If the rate at which the temperature responsive material contracts exceeds the rate at which the piston is moving inwardly in response to pressure of the spring, there will be formed a pocket or void space between the force-transmitting material and the rubber diaphragm. This pocket provides a space into which the vacuum may draw fluid from the ambient atmosphere. Thus under certain conditions the vacuum will cause ambient fluid to be drawn or sucked in through the joint between the piston and sleeve and into the aforementioned pocket. The presence of ambient fluid in this pocket is objectionable in that on successive temperature changes the piston will be moved at different temperatures and for different distances than that for which the thermostatic element is designed. In other words the calibration of the thermostatic element will be destroyed.

When a metallic diaphragm of sufficient strength and resistance to vacuum producing forces is employed the diaphragm will not move solely in response to contracting movement of the heat responsive material. Instead the diaphragm will be responsive to spring pressure as well as contracting movement of the heat responsive material. As a result no vacuum will be produced between the diaphragm and force-transmitting material and there will be no possibility for ambient fluid to enter into the interior of the thermostatic element.

The use of rubber as the diaphragm material is further disadvantageous by reason of certain organic halogen compounds which are preferably employed as the temperature responsive material. The rubber deteriorates in the presence of these organic compounds and since the diaphragm is engaged with the temperature responsive material, the rubber diaphragm in many cases deteriorates after a comparatively few temperature change cycles. The use of one of the stainless steels or other non-deteriorating materials has been found to appreciably increase the life of the diaphragm.

The use of metal as the diaphragm material presents certain problems not encountered when rubber is used as the diaphragm material. For example, when rubber is used as the diaphragm material the diaphragm is free to stretch and contract in accordance with expansion and contraction of the temperature responsive material. Most metals on the other hand do not have the ability to stretch and contract, and accordingly when metal is used as the diaphragm material the diaphragm must change its contour by some other means than stretching and contracting. In the present invention the metal diaphragm is provided with a series of corrugations. As the temperature responsive material expands it pushes against the diaphragm and causes the corrugations in the diaphragm to become almost flattened. In other words, the amplitude of the corrugations is decreased.

The use of corrugations to provide for expansion and contraction of the metal diaphragm has been found to give a construction having long life over extended temperature change cycles. During operation the diaphragm undergoes a minimum of flexing, and the possibilities of rupture are therefore considerably decreased as compared with a diaphragm construction, for example, wherein the diaphragm was formed as a concave element. Such a diaphragm would, on temperature change of the temperature responsive material, be caused to change from a concave configuration to a convex configuration. Such a configuration change would be accompanied by a violent folding or flexing of the diaphragm. The violent flexing would weaken the diaphragm material and would result in shortening its life.

One object of the present invention is to provide a thermostatic element operable in the temperature range of 250° F. to 350° F.

Another object is to provide a diaphragm for a thermostatic element which will not deteriorate or otherwise chemically react with the temperature responsive material in the thermostat casing.

Another object is to provide a thermostatic element wherein there is employed a diaphragm having sufficient resistance to pressure change as to prevent the drawing or sucking of ambient fluid into the thermostatic element interior on contraction of the temperature responsive material.

Another object is to provide a diaphragm which undergoes a minimum of flexing during expansion and contraction of the temperature responsive material.

Another object is to provide a thermostatic element wherein none of the heat responsive materials can escape from within the element casing, and wherein none of the ambient atmosphere can enter into the casing interior, whereby the thermostatic element will retain its calibration over extended temperature cycle changes.

Other objects of this invention will appear in the following description and appended claims, reference being had to the accompanying drawings forming a part of this specification wherein like reference characters designate corresponding parts in the several views.

In the drawings:

FIGURE 1 is a cross-sectional view taken through one embodiment of the invention at a period when the temperature responsive material is in a low temperature or contracted state, FIGURE 2 is a similar cross-sectional view taken through a second embodiment of the invention, and FIGURE 3 is a sectional view taken through a third embodiment of the invention.

Before explaining the present invention in detail it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In the drawings and particularly in FIGURE 1, there is shown a vessel 1 formed of copper or other heat conducting material. Positioned within vessel 1 is a pellet 2 of temperature responsive material. The temperature responsive material preferably comprises a mixture of one or more of the materials tetrachlorobenzene, tetrabromobenzene and tribromobenzene. These materials offer expansion properties in the range of about 250° F. to about 370° F., depending on the proportions of constituent materials employed. It should be noted that the temperature ranges are not critical and other materials having lower or higher temperature range expansion and contraction properties may be employed. To increase the responsiveness of the temperature responsive material to temperature changes in the ambient atmosphere there is preferably dispersed within the pellet material a quantity of heat conducting particles, of copper or aluminum for example.

Vessel 1 is provided with a ring-like, shoulder-forming wall 3. A metal diaphragm 5 is positioned over the mouth of vessel 1 and is welded onto shoulder-forming wall 3 by a continuous ring weld 4. Diaphragm 5 is metallic and is preferably formed of one of the stainless steels. These preferred metals do not chemically react with the temperature responsive materials 2, and there is no deterioration of the diaphragm. The metal diaphragm is relatively imporous so that no material is allowed to flow through the diaphragm either into or out of vessel 1. The use of the weld at 4 seals the edges of the diaphragm so that no material can flow into or out of vessel 1 in the joint between wall 3 and diaphragm 5.

Diaphragm 5 is provided with a plurality of ring-like corrugations 6. Upon temperature increase of vessel 1, temperature responsive material 2 will expand and the amplitude of corrugations 6 will be decreased. There is no stretching of diaphragm 5 during this period and the necessary expansion of diaphragm 5 is accomplished entirely by decreasing the amplitude of corrugations 6. At completion of the expansion of material 2, corrugations 6 will have decreased their amplitude considerably but the corrugations will still have retained their identity as corrugations. On temperature decrease of material 2 the corrugations will increase their amplitude until the diaphragm takes the configuration shown in FIGURE 1.

Overlying diaphragm 5 is a body of flowable force-transmitting material 7. This material preferably corresponds to that described and disclosed in copending application filed on April 1, 1955, Serial No. 498,655, now Patent No. 2,906,123, issued September 29, 1959. Material 7 is retained within a tapering cone-shaped housing 8 having a sleeve-like extension 9. It should be noted that material 7 overlies corrugations 6 and thereby reenforces and supports the corrugations against the pressure developed by material 2 on temperature increase. As a result, the corrugations are never completely flattened out or destroyed, and diaphragm 5 is free to return to the corrugated form shown in FIGURE 1. Flattening of the corrugations would cause the diaphragm to lose its flexibility and the diaphragm would thereby be subject to rupture after a comparatively few temperature change cycles.

Positioned above material 7, and at all times within sleeve-like extension 9, is an anti-chafing disc 10. This disc prevents any of materials 7 from moving into the joint 11 between sleeve 9 and the surface of a piston 12. None of material 7 is thereby subject to being carried out of the sleeve 9 with piston 12 and there is no danger that the thermostatic element will on that account lose its calibration.

Piston 12 is urged toward temperature responsive material 2 by a spring (not shown). During temperature increase of temperature responsive material 2 piston 12 will be urged upwardly in sleeve 9 and some of material 7 will be squeezed up into sleeve 9. During temperature decrease material 2 will contract and the spring will push piston 12 down in sleeve 9. The resistance of material 7 to being pushed downwardly may be so great that material 2 will contract faster than the spring can push piston 12 downwardly. As a result material 2 may leave diaphragm 5 behind so to speak, and there may be a void space between the surface 13 of material 2 and the adjacent surface of diaphragm 5. This void will create a vacuum tending to pull diaphragm 5 downwardly with material 2. If diaphragm 5 were formed of a material such as rubber having little or no resistance to pressure change, it would closely follow the contour of surface 13 and the aforementioned vacuum would be transferred to the space between diaphragm 5 and material 7. This diaphragm would tend to draw fluid from atmosphere 14 in through joint 11 and into the space between diaphragm 5 and material 7. Such a result would vary the amount of material between diaphragm 5 and piston 12 and would destroy calibration of the thermostatic element. However, diaphragm 5 is in fact formed of a metal having resistance to pressure change such that when material 2 contracts any vacuum which forms above surface 13 will not be transferred to the space between diaphragm 5 and material 7, and there will be no possibility for the vacuum to draw ambient fluid into the thermostat interior. As a result the possibility of destroying the calibration of the thermostat will be considerably reduced.

During temperature decrease disc 10 serves to prevent ambient fluid from entering into the thermostat interior via the bore in extension 9. There is a possibility that during temperature decrease material 7 may leave piston 12 and thereby form a void between material 7 and disc 10. This void would tend to draw ambient fluid in through joint 11 except that disc 10 exerts a sealing action to prevent the admission of ambient fluid.

The embodiment of the invention disclosed in FIGURE 2 is quite similar to that disclosed in FIGURE 1 and, accordingly similar reference numerals are employed to designate similar parts. In the FIGURE 2 embodiment diaphragm 5 is not welded directly on shoulder-forming wall 3. Instead there is provided a liner 15 formed of one of the stainless steels or other material having resistance to chemical combination with heat responsive material 2. Liner 15 is formed with a ring-like rim or flange 16 for its securement on diaphragm 5. Securement of diaphragm 5 and liner 15 is effected by welding edge portion 17 of the diaphragm and rim portion 16 of the liner together. This welding together of rim 16 and edge 17 provides a fluid tight joint which prevents fluid flow into or out of the space between elements 5 and 15. Elements 5 and 15 may, if desired, be considered as an "envelope" in that these elements enclose or "envelope" heat responsive material 2.

It should be noted that vessel 1 in both the FIGURE 1 and FIGURE 2 embodiments is formed as a section of a sphere. This spherical shape gives a maximum vessel surface to material 2 volume ratio. In other words the amount of external surface 18 presented by casing 1 is at a maximum as compared with a given volume of material 2 within said vessel. Surface 18 acts as a heat conducting surface from atmosphere 19 to temperature responsive material 2 and vice versa. Spherical casing 1 presents a maximum amount of heat conducting surface 18 and thereby increases the responsiveness of material 2 to temperature change in atmosphere 19. As a result the time lag between temperature change in atmosphere 19 and volumetric change of material 2 is at a minimum and the responsiveness of the thermostatic element is thereby increased.

The embodiment of the invention disclosed in FIGURE 3 is similar to that disclosed in FIGURE 2 except that vessel 1 in the FIGURE 3 embodiment is cylindrical instead of spherical. The FIGURE 3 embodiment is not quite as responsive to temperature changes in atmosphere 19 timewise, but the cylindrical casing encloses a greater amount of heat responsive material 2 so as to give a greater travel to piston 11 than that given to the piston in the FIGURE 1 and FIGURE 2 embodiments. Operationally speaking, the FIGURE 2 and FIGURE 3 embodiments function in the same manner as the FIGURE 1 embodiment. Therefore the operation of the FIGURE 2 and FIGURE 3 embodiments will not be described specifically.

We claim:

A thermostatic power element comprising a cup having a ring-like shoulder formed at its mouth; a metallic liner seated in the cup and having a peripheral rim portion seated on the shoulder; a thermally expansible pellet contained within the liner; a corrugated metal diaphragm overlying the pellet and having its edge portion welded to the liner rim portion to provide a continuous fluid tight joint; a housing overlying the diaphragm; said housing defining a tapering cavity having a major diameter corresponding to and mating with the internal diameter of the cup mouth, and a guide bore extending axially from the smaller end of said cavity; a piston slidably positioned in the guide bore; and a body of solid, flowable force-transmitting material filling the cavity.

References Cited in the file of this patent

UNITED STATES PATENTS

| | | |
|---|---|---|
| 116,273 | Common | June 27, 1871 |
| 515,293 | Lamplough | Feb. 20, 1894 |
| 1,294,484 | Krynitzky | Feb. 18, 1919 |
| 2,115,502 | Vernet | Apr. 26, 1938 |
| 2,368,181 | Vernet | Jan. 30, 1945 |
| 2,487,946 | Senn | Nov. 15, 1949 |
| 2,593,238 | Albright | Apr. 15, 1952 |
| 2,736,604 | Albright | Feb. 28, 1956 |

FOREIGN PATENTS

| | | |
|---|---|---|
| 510,721 | Germany | Oct. 22, 1930 |
| 702,868 | France | Jan. 27, 1931 |